No. 794,897. Patented July 18, 1905.

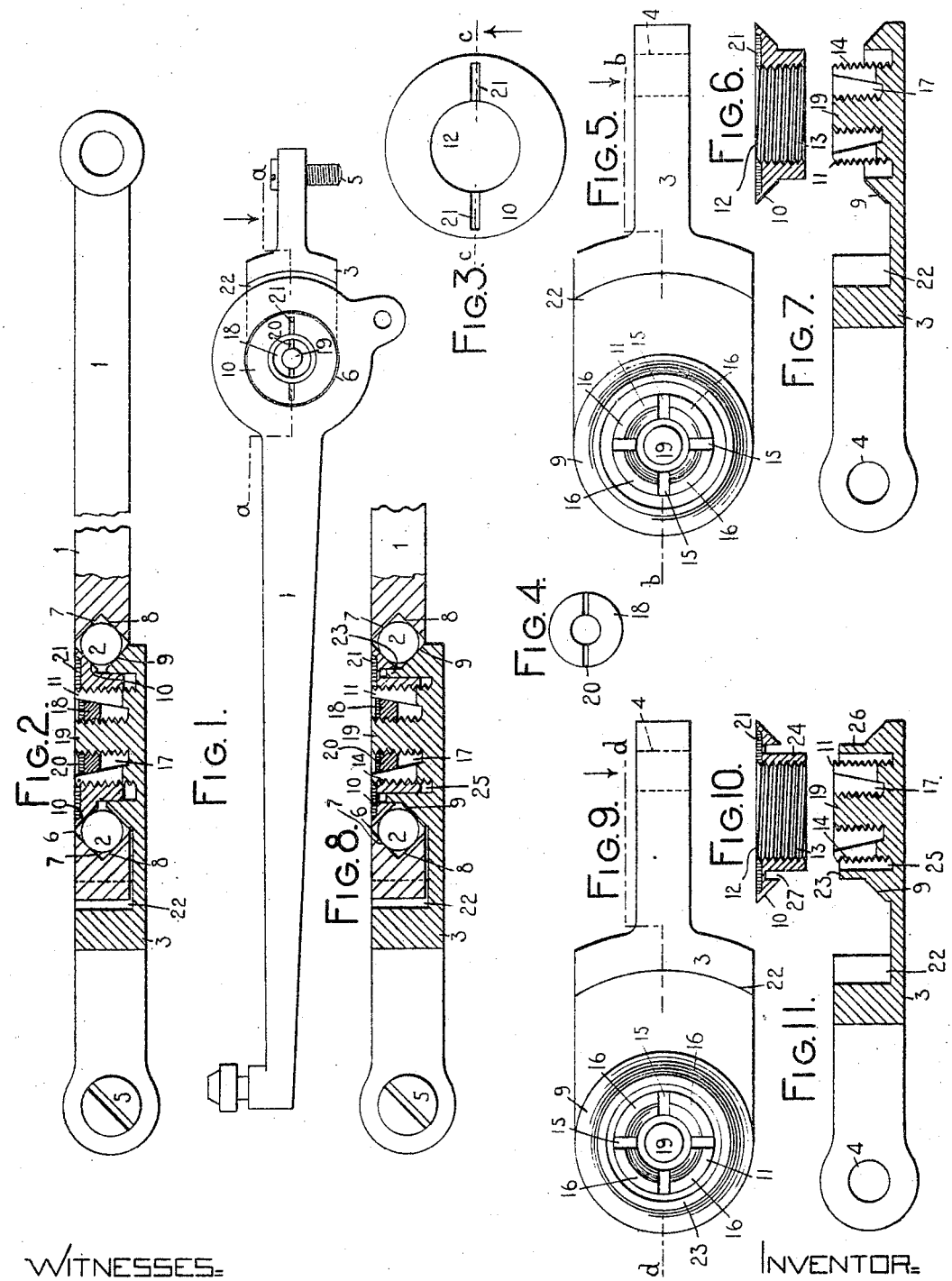

UNITED STATES PATENT OFFICE.

BURNHAM C. STICKNEY, OF ELIZABETH, NEW JERSEY, ASSIGNOR TO UNION TYPEWRITER COMPANY, OF JERSEY CITY, NEW JERSEY, A CORPORATION OF NEW JERSEY.

TYPE-WRITING MACHINE.

SPECIFICATION forming part of Letters Patent No. 794,897, dated July 18, 1905.

Application filed March 25, 1903. Serial No. 149,512.

*To all whom it may concern:*

Be it known that I, BURNHAM C. STICKNEY, a citizen of the United States, and a resident of Elizabeth, in the county of Union and State of New Jersey, have invented certain new and useful Improvements in Type-Writing Machines, of which the following is a specification.

My invention relates to thin type-bar and hanger ball-bearing joints of the class described in the patent to A. T. Brown, No. 653,905, dated July 17, 1900; and its object is to provide for making the jointed structure more compact or thinner, so as to enable a full series thereof to be grouped within a smaller compass in a type-writing machine and to provide for accurate adjustment or take-up of the joint, as well as for securely binding the adjustable portion of the joint so that the same will not be liable to work loose. I aim to minimize the number of parts, to reduce the expense of manufacture, and to render the structure reliable in use.

My invention consists in certain features of construction and combinations of devices hereinafter fully described, and particularly pointed out in the concluding claims.

In the drawings forming part of this specification, Figure 1 is a side view of a type-bar and hanger jointed together by means of my improvements. Fig. 2 is an enlarged sectional view taken on the line $a\,a$ of Fig. 1. Fig. 3 is a top view of an adjustable or cap cone. Fig. 4 is a top view of a locking-nut. Fig. 5 is a side view of the hanger. Fig. 6 is a sectional view of the adjustable cone, taken on the line $c\,c$ of Fig. 3. Fig. 7 is a sectional view of the hanger on the line $b\,b$ of Fig. 5. Fig. 8 is a view similar to Fig. 2, but showing the preferred form of my invention. Fig. 9 is a side view of the hanger shown at Fig. 8. Fig. 10 is a sectional view of the preferred form of adjustable cone which is seen at Fig. 8. Fig. 11 is a separate view of the hanger seen at Fig. 8, this view being taken on the line $d\,d$ of Fig. 9.

In the several figures like signs denote like parts.

Referring to Figs. 1 to 7, inclusive, a type-bar 1 works upon a single circular set of bearing-balls 2, carried by a hanger 3, which may be perforated at 4 to receive a binding-screw 5, whereby it is secured to the framing of the type-writer. The type-bar may be provided with a large eye 6, which is interiorly V-grooved to form opposing cones 7 and 8, which taken together form a track for the balls. Within said eye the hanger is provided with an integral cone 9 and an opposing cone 10, which cones taken together form another track for the balls. The two tracks taken together form a complete ball-race.

The cone 10 is movably mounted upon the cone 9, so as to admit of the adjustment requisite in fitting the parts together when manufacturing or repairing the machine. For the purpose of such adjustment I provide the fixed cone 9 in this instance with a threaded integral stud or shank 11, which is tapped into a perforation 12, formed in the movable cone 10, the threads in said perforation being indicated at 13 and the threads upon the stud at 14. Said stud may be of relatively great diameter, as illustrated, to facilitate such fine adjustment as is desirable in joints of this class, this object being also favored by making the thread of fine pitch. It will be seen that when the parts so far described are assembled the adjustable cone 10 may be turned in either direction to raise or lower it upon the stud 11 till the race is fitted to the balls, so that the joint may be tight while the balls may run freely.

To enable the adjustable cone to be secured or locked wherever it may be set, I preferably cross-split the stud 11, as at 15, thus dividing the same into a set of prongs 16. These prongs, it will be understood, may be sprung outwardly to an extent sufficient for binding the adjustable cone 10, mounted thereon. For this purpose I preferably form the stud 11 with a tapering hollow or cup 17, within which fits a conical nut 18. This nut may work upon a central threaded stud 19, preferably also formed integral upon the hanger. The cavity 17 and the nut 18 are each larger at the top than at the bottom, so that by screwing the nut down the prongs 16 may be spread out sufficiently to bind or lock the adjustable cone 10. The nut may be provided with a nick 20 and the cone with a nick 21, adapted for suitable adjusting-tools.

It will be seen that the hanger is recessed at 22 to receive the hub of the type-bar, this portion of the hanger being preferably plate-like and thinner than the type-bar and lying snugly facewise to the type-bar and occupying but little room, the width of the entire jointed structure being but little, if any, greater than the width of the shank of a type-bar of ordinary dimensions.

Referring now to Figs. 8 to 11, inclusive, it will be seen that in the preferred form of the invention one of the relatively adjustable cones, in this instance the cone formed upon the hanger, is provided with a socket 23, (clearly seen at Fig. 11,) which receives the shank 24 of the adjustable cone, Fig. 10. The provision of a socket into which the shank closely fits I deem of importance, because a true set of the adjustable cone is secured, and hence a true bearing of the balls in the entire race is assured. There is sufficient control of the shank 24 and the socket to avoid the liability of the adjustable cone to skew, which liability would be present if the fit of the cone upon the stud 11 were solely relied upon. Owing to the provision of the socket, there may be a loose fit of the screw-threads without danger of the cone 10 tipping out of its true relation to the cone 9. This positive guide for the adjustable cone is of special importance where the race is not filled entirely with balls, as is sometimes the case, since under all conditions the adjustable or cap cone is accurately positioned. I prefer to make the socket as deep and high as possible, so as to have a maximum extent of bearing upon the cone-shank 24, and to this end I cut the annular socket-groove 25 deeply, said groove extending nearly to the outer face of the hanger; and I also preferably project the socket-wall from the body of the cone 9, as at 26, this projecting portion being received by an annular recess 27, which may be formed in the adjustable cone 10 between the shank and the working bevel of the cone, Fig. 10. Thus it will be seen that the very thin jointed structure illustrated comprises a set of bearing-balls and four cones, one whereof is adjustable and sets true at all adjustments, while means for locking the same wherever adjusted is also provided, said means being confined within the general contour of the structure.

The type-bar and hanger may of course be otherwise formed within the scope of my invention, and portions of my improvements may be used without others.

It will be seen that my invention comprises a type-bar and a hanger pivoted together, one of said members (in this instance the type-bar) having an eye and the other of said members (in this instance the hanger) having a ball-track within said eye, one of said eye and track elements (preferably the track element) comprising a cone 9 and an opposing cone 10, locked in position upon said cone; that the head of the cone 10 is substantially flush with the flank of the type-bar, thus conducing to compactness, this result being gained by mounting said cone upon its mate; that the cone 9 and screw 11 may be formed in a single piece; that means are provided within the exteriorly-threaded stud or screw 11 for expanding the same; that such stud has also an interior threaded portion, preferably consisting of the interior stud 19; that the expander 18 is threaded into said hollow stud, and that the depth of the socket 23 is nearly equal to the thickness of the hanger at said cone.

It is to be understood that my invention includes transpositions and reversals of parts and variations in details of construction of the joint, hanger, and type-bar, one of the leading features of my invention consisting in the provision of means for adjusting, substantially in the described manner, one of the four cones which together make up the entire ball-race, although not necessarily the particular cone herein given as an illustration, and in providing means for locking said cone wherever it is adjusted. The centrally-tapped stud 19 may be omitted, and the conical locking member 18 may be forced inwardly in any suitable manner—as, for instance, it may be taper-tapped into the hollow cone. A ball-bearing device may also be applied to each side of the hanger instead of to only one side, as herein illustrated, so that one hanger may carry two type-bars, and many other changes in details of construction may be resorted to within the scope of my improvements.

Certain features herein shown are described and claimed in my pending application, Serial No. 148,930, filed March 21, 1903.

What I claim as new, and desire to secure by Letters Patent, is—

1. The combination of a type-bar having a V-grooved eye; a hanger having an integral cone within said eye and also having a central integral threaded stud; a perforated tapped cone adjustable upon said stud; and a set of bearing-balls confined between said cones and said eye, said hanger being laterally recessed to receive the hub of the type-bar.

2. The combination of a type-bar and a hanger pivoted together; one of said members having an eye and the other of said members having two cones within said eye; one of said cones having a taper-hollowed split stud threaded exteriorly, and the other of said cones being perforated and adapted to fit upon said stud; a threaded central stud within said hollow stud; a tapering nut working upon said central stud for expanding said split stud; and a set of bearing-balls confined between said cones and said eye.

3. The combination of a type-bar and a hanger pivoted together; one of said members having an eye and the other of said members having opposing cones within said eye; one of said cones being formed integral upon its member, and having an interior socket, and the other of said cones having a shank fitting closely within said socket; said shank having a perforation, and a stud being provided interiorly of said socket, and being threaded into said perforation; and a set of bearing-balls confined between said cones and said eye.

4. The combination of a type-bar and a hanger pivoted together; one of said members having an eye and the other of said members having opposing cones within said eye; one of said cones being formed integral upon its member, and having an interior socket, the wall of which projects from said cone, and said socket being of a depth nearly equal to the thickness of the hanger at said cone; and the other of said cones having a perforated shank fitting closely within said socket; a stud upon said socket member and tapped into the perforation in said shank; and a set of bearing-balls confined between said cones and said eye.

5. The combination of a type-bar and a hanger pivoted together; one of said members having an eye and the other of said members having opposing cones within said eye; one of said cones being formed integral upon its member, and having an interior socket within which is a split threaded stud; and the other of said cones having a shank fitting closely within said socket, and said shank being perforated and adapted to work upon said stud; means for expanding said stud; and a set of bearing-balls confined between said cones and said eye.

6. The combination of a type-bar and a hanger pivoted together; one of said members having an eye and the other of said members having opposing cones within said eye; one of said cones being formed integral upon its member, and having an interior socket within which is a split threaded stud; and the other of said cones having a shank fitting closely within said socket, and said shank being perforated and adapted to work upon said stud; an expanding device threaded into the hollow of the stud; and a set of bearing-balls confined between said cones and said eye.

7. The combination of a type-bar and a hanger pivoted together; one of said members having an eye and the other of said members having opposing cones within said eye; one of said cones being formed integral upon its member, and having an interior socket within which is a threaded stud; the wall of said socket projecting from said cone; said stud, cone and socket being integral; the other of said cones having a shank fitting closely within said socket, and said shank being perforated and adapted to work upon said stud; and a set of bearing-balls confined between said cones and said eye.

8. The combination of a type-bar and a hanger pivoted together; one of said members having an eye and the other of said members having opposing cones within said eye; one of said cones being formed integral upon its member, and having an interior socket within which is an integral threaded stud; the wall of said socket projecting from said cone, and said socket being of a depth nearly equal to the thickness of the hanger at said cone; the other of said cones having a shank fitting closely within said socket, and said shank being perforated and adapted to work upon said stud; a set of bearing-balls being confined between said cones and said eye; and said adjustable cone having an annular recess for receiving the projecting portion of said socket.

9. The combination of a type-bar and a hanger pivoted together; one of said members having a grooved eye and the other of said members having opposing cones within said eye; one of said cones having a hole and the other of said cones having a shank tapped into said hole, and a threaded member clamping said cones at any relative position to which they may be adjusted; and a set of bearing-balls being confined between said cones and said eye.

10. The combination of a type-bar and a hanger pivoted together; one of said members having a grooved eye and the other of said members having opposing cones within said eye; one of said cones having a hole and the other of said cones having a split shank tapped into said hole, a threaded expanding member for clamping said cones at any relative position to which they may be adjusted; and a set of bearing-balls between said cones and said eye.

11. The combination of a type-bar having a ball-track, a hanger having a fixed cone and an adjustable cone, a set of antifriction-balls, a split hollow stud or shank, a beveled nut adapted to expand the shank from its interior, and a threaded stem on which the nut is received.

12. The combination of a ball-bearing type-bar, a hanger having a cone, a split hollow shank, a cone-piece adapted to be adjusted on the shank, a set of antifriction-balls, a central stud within said shank, and a beveled nut adjustable on the central stud and adapted to expand the slotted hub.

13. The combination of a ball-bearing type-bar, a hanger, a cone on the hanger, a slotted shank, a cone adapted to be adjusted on the shank, a centering shank and socket, and means for locking the cone when adjusted.

Signed at the borough of Manhattan, city of New York, in the county of New York and State of New York, this 24th day of March, A. D. 1903.

BURNHAM C. STICKNEY.

Witnesses:
K. V. DONOVAN,
M. F. HANNWEBER.